US008014356B2

(12) United States Patent
Tebbs et al.

(10) Patent No.: US 8,014,356 B2
(45) Date of Patent: Sep. 6, 2011

(54) OPTIMAL-CHANNEL SELECTION IN A WIRELESS NETWORK

(75) Inventors: Matthew Tebbs, Seattle, WA (US); Brett Marl, Seattle, WA (US); Steve Kelley, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 857 days.

(21) Appl. No.: 11/867,676

(22) Filed: Oct. 4, 2007

(65) Prior Publication Data
US 2009/0017832 A1    Jan. 15, 2009

Related U.S. Application Data

(60) Provisional application No. 60/949,622, filed on Jul. 13, 2007.

(51) Int. Cl.
*H04W 4/00* (2009.01)
(52) U.S. Cl. .................................................. 370/331
(58) Field of Classification Search ................ None
See application file for complete search history.

(56) References Cited

U.S. PATENT DOCUMENTS

| | | | |
|---|---|---|---|
| 5,383,178 A | 1/1995 | Unverrich |
| 5,396,485 A | 3/1995 | Ohno et al. |
| 5,768,483 A | 6/1998 | Maniwa et al. |
| 5,774,667 A | 6/1998 | Garvey et al. |
| 5,974,237 A | 10/1999 | Shurmer et al. |
| 5,978,568 A | 11/1999 | Abraham et al. |
| 6,006,272 A | 12/1999 | Aravamudan et al. |
| 6,023,723 A | 2/2000 | McCormick et al. |
| 6,157,950 A | 12/2000 | Krishnan |
| 6,456,306 B1 | 9/2002 | Chin et al. |
| 6,530,018 B2 | 3/2003 | Fleming |
| 6,584,074 B1 | 6/2003 | Vasamsetti et al. |
| 6,631,118 B1 | 10/2003 | Jones |
| 6,678,250 B1 | 1/2004 | Grabelsky et al. |
| 6,728,262 B1 | 4/2004 | Woram |
| 6,778,505 B1 | 8/2004 | Bullman et al. |
| 6,801,941 B1 | 10/2004 | Stephens et al. |

(Continued)

FOREIGN PATENT DOCUMENTS

JP    2001-222497 A    8/2001

(Continued)

OTHER PUBLICATIONS

Marcia Zangrilli, et al., "Using Passive Traces of Application Traffic in a Network Monitoring System," copyright 2004 IEEE.

(Continued)

*Primary Examiner* — Raj K Jain
(74) *Attorney, Agent, or Firm* — Patent Capital Group (57) ABSTRACT

A machine-implementable method of optimizing the performance of a wireless network includes collecting, with a first discovery component of the wireless network, a first set of information describing at least one transmission characteristic of each access point of a first set of at least one access points within a detection area of the first discovery component. Each access point of the first set transmits data over a respective channel of a set of channels. The method further includes determining, based on the first-set information, an optimal channel of the set of channels, the optimal channel having associated therewith the lowest probability of interference with the channels over which the access points of the first set are transmitting.

21 Claims, 9 Drawing Sheets

U.S. PATENT DOCUMENTS

| | | | |
|---|---|---|---|
| 6,892,245 B1 | 5/2005 | Crump et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,027,808 B2 | 4/2006 | Wesby |
| 7,039,688 B2 | 5/2006 | Matsuda et al. |
| 7,042,988 B2 | 5/2006 | Juitt et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,187,461 B2 | 3/2007 | Schlonski et al. |
| 7,200,551 B1 | 4/2007 | Senez |
| 7,240,106 B2 | 7/2007 | Cochran et al. |
| 7,269,653 B2 | 9/2007 | Mentze et al. |
| 7,283,517 B2 | 10/2007 | Yan et al. |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2 | 6/2008 | Motoyama et al. |
| 7,421,466 B2 | 9/2008 | Haines |
| 7,457,737 B2 | 11/2008 | Patiejunas |
| 7,460,546 B2 | 12/2008 | Anderson, IV |
| 7,475,133 B2 | 1/2009 | Nuggehalli |
| 7,496,660 B2 | 2/2009 | Blaisdell et al. |
| 7,499,999 B2 | 3/2009 | Ocepek et al. |
| 7,509,415 B2 | 3/2009 | Baekelmans et al. |
| 7,545,762 B1 | 6/2009 | McConnell et al. |
| 7,565,418 B2 | 7/2009 | Ferrari et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 7,787,416 B2 * | 8/2010 | Gidwani ................... 370/329 |
| 7,853,880 B2 | 12/2010 | Porter |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0196463 A1 | 12/2002 | Schlonski et al. |
| 2003/0005112 A1 | 1/2003 | Krautkremer |
| 2003/0033402 A1 | 2/2003 | Battat et al. |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078999 A1 | 4/2003 | Lund et al. |
| 2003/0086425 A1 | 5/2003 | Bearden et al. |
| 2003/0115298 A1 | 6/2003 | Baker |
| 2003/0115314 A1 | 6/2003 | Kawashima |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0229688 A1 | 12/2003 | Liang |
| 2004/0003292 A1 | 1/2004 | Kato |
| 2004/0030620 A1 | 2/2004 | Benjamin et al. |
| 2004/0040023 A1 | 2/2004 | Ellis et al. |
| 2004/0059804 A1 | 3/2004 | Goto |
| 2004/0064558 A1 | 4/2004 | Miyake |
| 2004/0093383 A1 | 5/2004 | Huang et al. |
| 2004/0111505 A1 | 6/2004 | Callahan et al. |
| 2004/0155899 A1 | 8/2004 | Conrad |
| 2004/0162986 A1 | 8/2004 | Metzger |
| 2004/0172469 A1 | 9/2004 | Takahashi et al. |
| 2004/0193709 A1 | 9/2004 | Selvaggi et al. |
| 2004/0199647 A1 | 10/2004 | Ramarao et al. |
| 2004/0215791 A1 | 10/2004 | Tsao |
| 2004/0236759 A1 | 11/2004 | Young |
| 2005/0018241 A1 | 1/2005 | Azami |
| 2005/0050189 A1 | 3/2005 | Yang |
| 2005/0060535 A1 | 3/2005 | Bartas |
| 2005/0063350 A1 | 3/2005 | Choudhury et al. |
| 2005/0078681 A1 | 4/2005 | Sanuki et al. |
| 2005/0086197 A1 | 4/2005 | Boubez et al. |
| 2005/0091504 A1 | 4/2005 | Shirogane |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0184852 A1 | 8/2005 | Lee et al. |
| 2005/0198274 A1 | 9/2005 | Day |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240758 A1 | 10/2005 | Lord et al. |
| 2005/0288000 A1 | 12/2005 | Harris et al. |
| 2006/0036847 A1 | 2/2006 | Bush et al. |
| 2006/0037036 A1 | 2/2006 | Min et al. |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168195 A1 | 7/2006 | Maturana et al. |
| 2006/0168263 A1 | 7/2006 | Blackmore |
| 2006/0280189 A1 | 12/2006 | McRae et al. |
| 2006/0291443 A1 | 12/2006 | Harrington et al. |
| 2007/0022185 A1 | 1/2007 | Hamilton et al. |
| 2007/0058567 A1 | 3/2007 | Harrington et al. |
| 2007/0076621 A1 | 4/2007 | Malhotra et al. |
| 2007/0106768 A1 | 5/2007 | Frietsch et al. |
| 2007/0111568 A1 | 5/2007 | Ferrari et al. |
| 2007/0130286 A1 | 6/2007 | Hopmann et al. |
| 2007/0133569 A1 | 6/2007 | Lee et al. |
| 2007/0143749 A1 | 6/2007 | Date et al. |
| 2007/0204150 A1 | 8/2007 | Jokela et al. |
| 2007/0268506 A1 | 11/2007 | Zeldin |
| 2007/0268515 A1 | 11/2007 | Freund et al. |
| 2007/0268516 A1 | 11/2007 | Bugwadia et al. |
| 2008/0037552 A1 | 2/2008 | Dos Remedios et al. |
| 2008/0049779 A1 | 2/2008 | Hopmann et al. |
| 2008/0052384 A1 | 2/2008 | Marl et al. |
| 2008/0065760 A1 | 3/2008 | Damm et al. |
| 2008/0070603 A1 | 3/2008 | Mao |
| 2008/0134164 A1 | 6/2008 | Stich et al. |
| 2008/0243699 A1 | 10/2008 | Hilerio et al. |
| 2009/0019141 A1 | 1/2009 | Bush et al. |
| 2009/0019147 A1 | 1/2009 | Ahlers et al. |
| 2009/0019314 A1 | 1/2009 | Younger et al. |
| 2009/0052338 A1 | 2/2009 | Kelley et al. |
| 2009/0055514 A1 | 2/2009 | Tebbs et al. |
| 2010/0020694 A1 | 1/2010 | Jones |

FOREIGN PATENT DOCUMENTS

| | | |
|---|---|---|
| JP | 2001-352328 A | 12/2001 |
| KR | 2004-0047209 A | 7/2004 |
| KR | 10-2005-0031175 A | 4/2005 |
| KR | 2005-0078541 A | 8/2005 |
| KR | 2005-0094247 A | 9/2005 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |

OTHER PUBLICATIONS

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Spetember 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

PCT Notification of the International Search Report and the Written Opinion of the International Searching Authority, or the Declaration, International Application No. PCT/US2008/063318, mailed Sep. 25, 2008, 6 pgs.

U.S. Appl. No. 11/696,638, filed Apr. 4, 2007, entitled "Network Management Providing Network Health Information and Lockdown Security," Inventor(s) Steve Bush et al.

U.S. Appl. No. 13/029,335, filed Feb. 17, 2011, entitled "Network Management," Inventor(s) Steven M. Bush, et al.

U.S. Appl. No. 13/030,982, filed Feb. 18, 2011, entitled "Network Management," Inventor(s) Steven M. Bush, et al.

U.S. Appl. No. 13/031,121, filed Feb. 18, 2011, entitled "Network Management," Inventor(s) Steven M. Bush, et al.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

Microsoft Corporation, "Windows Connect Now—UFD for Windows XP Specification," © 2010, Updated Sep. 15, 2006, 1 page; http://www.microsoft.com/whdc/connect/Rally/WCN-UFD_XPspec.mspx.

Microsoft Corporation, "Windows Connect Now—UFD for Windows Xp," Version 1.1 © 2010—Sep. 15, 2006, 33 pages; http://www.microsoft.com/whdc/connect/Rally/WCN-Netspec.doc.

Microsoft Corporation, "Windows Connect Now—UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now—UFD Windows Vista" Version 1.0 © 2010—Sep. 15, 2006, 28 pages; http://www.microsoft.com/whdc/connect/Rally/WCN-UFD_Vistaspec.doc.

Microsoft Corporation, "Windows Connect Now —Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

Flip Video, "Quick Start Guide: FlipshareTV," © 2009 Cisco Systems, Inc., 19 pages; http://www.theflip.com/pdf/en-US/FlipShareTVQuickStartGuide.pdf.

"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.

"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.

"Wi-Fi Alliance™ for Wi-Fi Protected Setup Specification," Version 1.0h, Dec. 2006, 110 pages.

Byoung-Koo Kim/Jong-Su Jang/Tai M. Chung, Design of Network Security Control System for Cooperative Intrusion Detection, 2002, pp. 389-398.

International Preliminary Report on Patentability issued Jan. 19, 2010 (1 page) and Written Opinion of the International Searching Authority mailed Oct. 30, 2008 (4 pages) for International Application No. PCT/US2008/063308.

International Preliminary Report on Patentability issued Jan. 19, 2010 (1 page) and Written Opinion of the International Searching Authority mailed Sep. 26, 2008 (4 pages) for International Application No. PCT/US2008/063333.

International Preliminary Report on Patentability issued Jan. 19, 2010 (1 page) and Written Opinion of the International Searching Authority mailed Sep. 22, 2008 (4 pages) for International Application No. PCT/US2008/063335.

* cited by examiner

OPTIMAL-CHANNEL SELECTION IN A WIRELESS NETWORK

PRIORITY CLAIM

This application claims priority from U.S. Provisional Patent Application No. 60/949,622, filed Jul. 13, 2007, entitled "METHOD FOR OPTIMIZING A WIRELESS NETWORK BY SURVEYING WIRELESS CHANNEL DENSITY," which is hereby incorporated by reference in its entirety as if fully set forth herein.

FIELD OF THE INVENTION

Embodiments of the present invention are directed generally toward wireless computer networks, and more specifically to determination and implementation of optimal settings for such networks.

BACKGROUND OF THE INVENTION

Computers have become commonplace tools in modern society, and many businesses and residences now have one or more computing devices. In a small business, for example, some employees may each use a desktop computer or laptop computer. Some employees may even use more portable computers such as personal digital assistants or "smart" wireless telephones. Similarly, with a family sharing a residence, each family member may have his or her personal computer, or the family members may share one or more computers. Further, both small businesses and personal residences may include various computing appliances that incorporate or otherwise interact with computers. For example, a home residence may include a refrigerator, a "Voice over Internet Protocol" telephone, a digital music server, a digital camera, or an environmental control system that includes or interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private networks or a public network, such as the Internet. By sending and receiving messages through the router, each networked computing device may then communicate with computing devices outside of the private network. In this arrangement, the router serves as a "gateway" device that provides a gateway to and from the private network. Wireless gateway devices are often referred to as "access points."

While this type of small or "home" network can provide enhanced utility for its member computing devices, even a small network can be very difficult for a non-technical person to set up and maintain.

IEEE 802.11, also known by the term Wi-Fi, denotes a set of Wireless LAN/WLAN standards developed by working group 11 of the IEEE LAN/MAN Standards Committee (IEEE 802). The 802.11 family currently includes six over-the-air modulation techniques that all use the same protocol. The most popular techniques are those defined by the b, a, g and n amendments to the original standard.

802.11b, 802.11g, and 802.11n standards use the 2.40 GHz (gigahertz) band, operating (in the United States) under Part 15 of the FCC Rules and Regulations. Because of this choice of frequency band, 802.11b and 802.11g equipment can encounter interference from microwave ovens, cordless telephones, Bluetooth devices, and other appliances using this same band.

Figure 1:
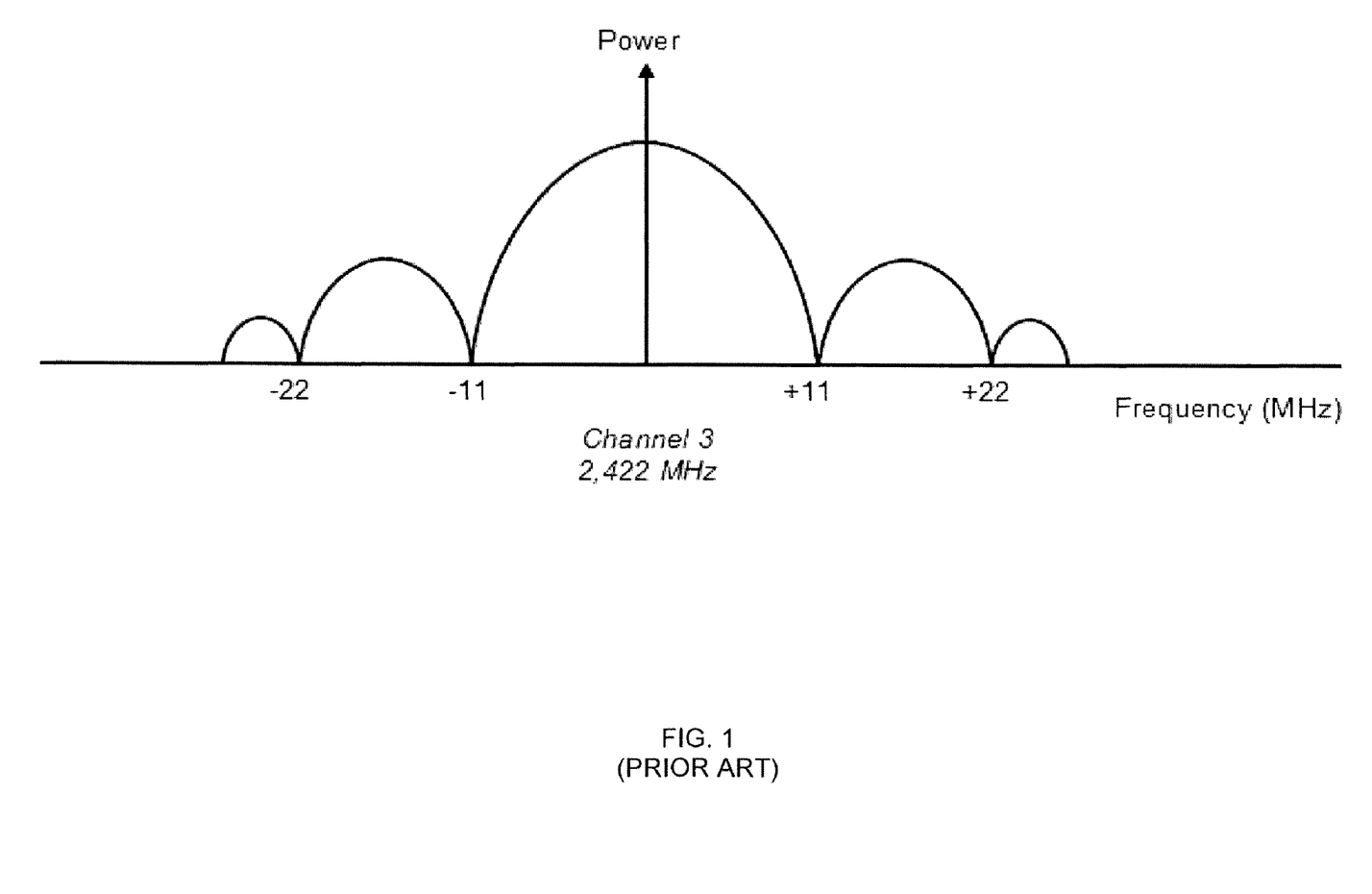
FIG. 1 is an illustration of an energy signature associated with a wireless channel.

802.11b and 802.11g—as well as 802.11n when using the 2.4 GHz band—divide the 2.4 GHz spectrum into 14 overlapping, staggered channels whose center frequencies are 5 megahertz (MHz) apart. The 802.11b, and 802.11g standards do not specify the width of a channel; rather, they specify the center frequency of the channel and a spectral mask for that channel. The spectral mask for 802.11b requires that the signal be attenuated by at least 30 dB from its peak energy at ±11 MHz from the center frequency, and attenuated by at least 50 dB from its peak energy at ±22 MHz from the center frequency. An example of such an energy signature associated with a given channel is shown in FIG. 1.

Figure 2:
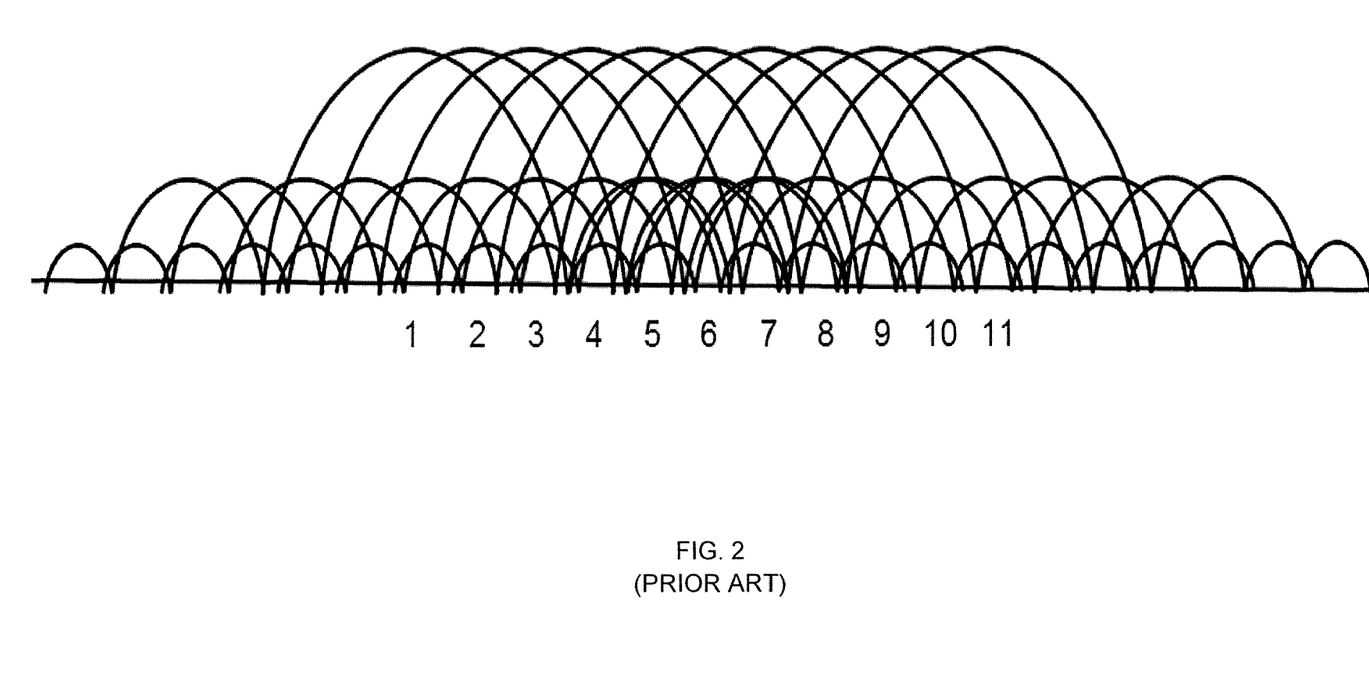
FIG. 2 is an illustration of a full range of wireless-channel energy signatures.

In the USA, only channels 1-11 of the 14 available channels are used. As each channel is overlapped and staggered 5 MHz apart, the full range of energy signatures can be plotted as shown in FIG. 2.

Figure 3:
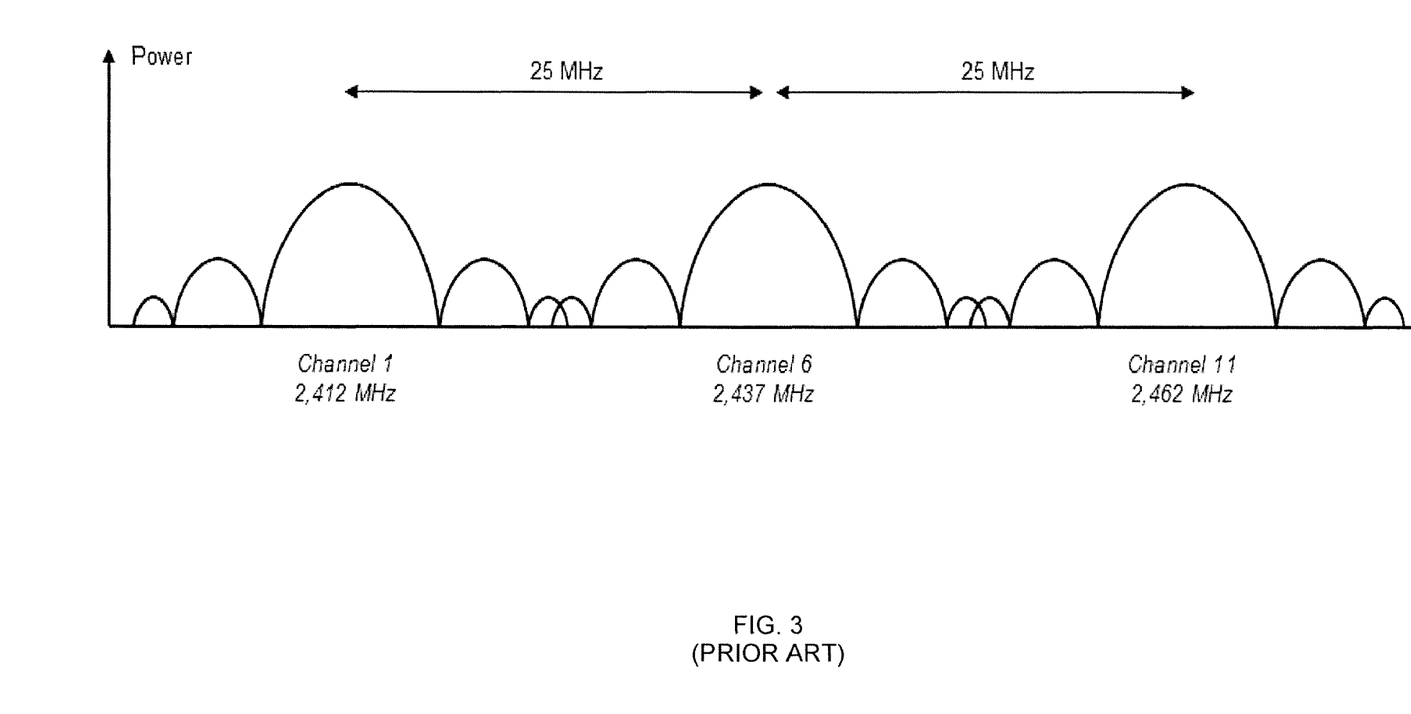
FIG. 3 is a second illustration of a full range of wireless-channel energy signatures.

A common approach for configuring a wireless network is to operate the network on Channels 1, 6 or 11. These channels are each 25 MHz apart and so have the lowest amount of impact on each other, as is shown in FIG. 3. The large majority of routers shipping in the USA are hard-coded to channel 6 as the default channel.

When considering the performance characteristics of a particular computer in a home network environment, users are typically concerned with factors such as:
How fast can I stream video content from the internet to this wireless enabled device?
How fast do web pages load?
How fast can I transfer files between computers on my network?

The speed at which transfer can occur on a wireless network is gated by many factors, including but not limited to the signal strength between the laptop and router, and the amount of overlapping transmissions from other nearby wireless access points.

Generally speaking, improving the signal strength from a given wireless device is affected by proximity to the access point it is communicating with. A typical consumer can grasp this concept, and can locate their access point in a desirable location to improve signal strength. Determining the amount of overlapping transmissions from other nearby wireless devices, however, is more difficult and beyond the comprehension of an average consumer.

BRIEF SUMMARY OF THE INVENTION

An embodiment of the invention includes a machine-implementable method of optimizing the performance of a wireless network includes collecting, with a first discovery component of the wireless network, a first set of information describing at least one transmission characteristic of each access point of a first set of at least one access points within a detection area of the first discovery component. Each access point of the first set transmits data over a respective channel of a set of channels. The method further includes determining, based on the first-set information, an optimal channel of the set of channels, the optimal channel having associated therewith the lowest probability of interference with the channels over which the access points of the first set are transmitting.

BRIEF DESCRIPTION OF THE DRAWING

Preferred and alternative embodiments of the present invention are described in detail below with reference to the following figures.

DETAILED DESCRIPTION OF THE INVENTION

An embodiment of the invention aids a proprietor of a wireless network in configuring the network by scanning the access points in the vicinity of the network and selecting the channel with the lowest probability of encountering overlapping transmissions.

Embodiments and elements thereof may incorporate or otherwise employ features described in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications, along with U.S. Provisional Patent Application No. 60/789,522, filed Apr. 4, 2006, entitled "Network Management," U.S. patent application Ser. No. 10/916,642, filed on Aug. 10, 2004, entitled "Service Licensing And Maintenance For Networks," U.S. patent application Ser. No. 11/457,783, filed on Jul. 14, 2006, entitled "Network Device Management," and U.S. patent application Ser. No. 11/457,763, filed on Jul. 14, 2006, entitled "Network Device Setup Utility," are incorporated entirely herein by reference.

Figure 4:
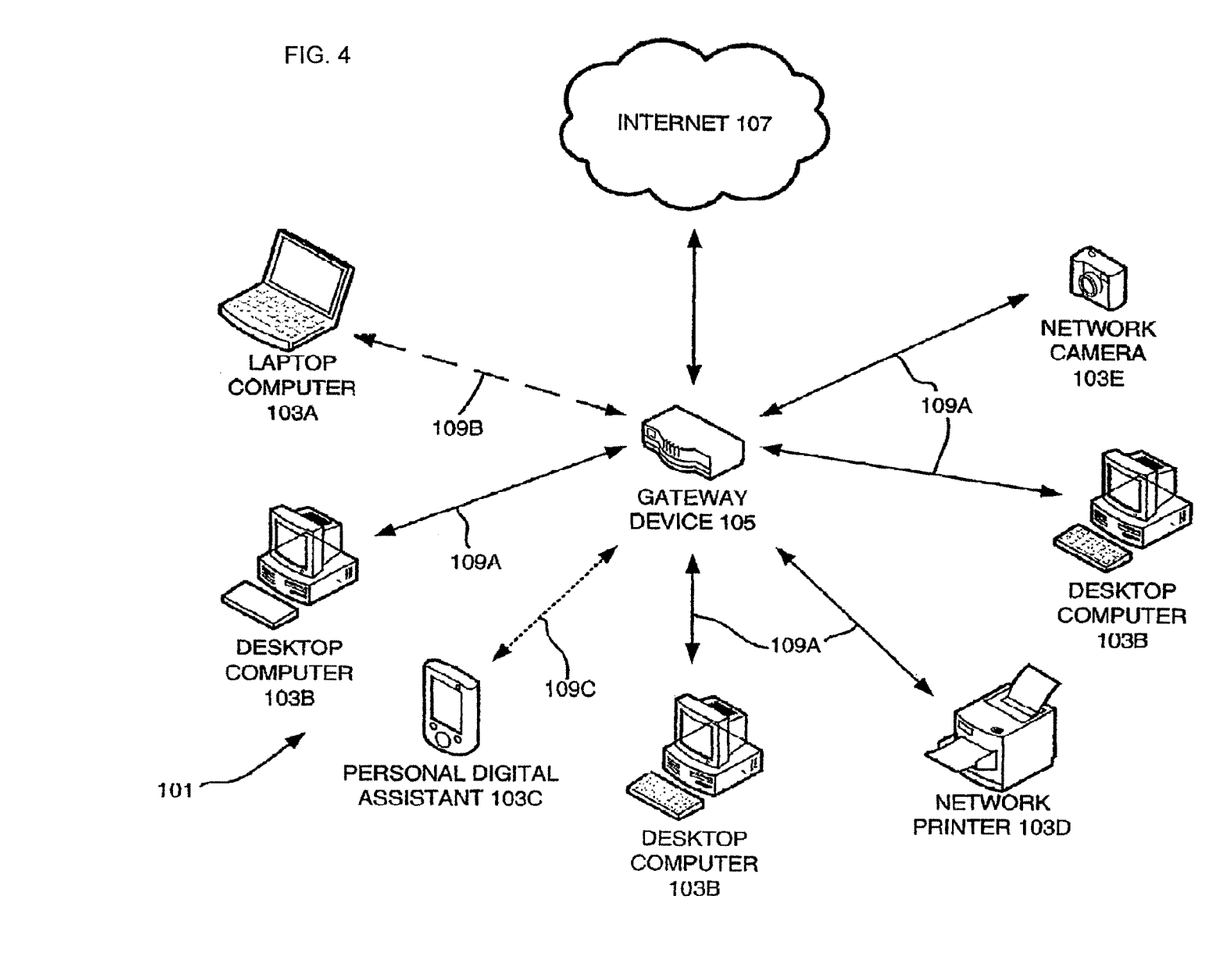
FIG. 4 is a functional block diagram of a network operating environment in which an embodiment of the present invention may be implemented.

Various embodiments of the invention may be implemented within and by a wireless local-area, or otherwise small, network. FIG. 4 illustrates an example of this type of small network. The network 101 may include a variety of different computing devices or "nodes". For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103, as illustrated in FIG. 4. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway device 105. In turn, the gateway device 105 typically will communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it can convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 4, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 can communicate with the gateway device 105 using one or more defined communication protocols, such as the Transmission Control Protocol (TCP) and the Internet Protocol (IP).

With these communication protocols, each computing device 103 and gateway device 105 in the network 101 can be assigned a logical address. For example, if the network 101 is connected to the Internet 107 through an Internet service provider, the Internet service provider can assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically can also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

A network may include both virtual devices and physical devices. Physical network devices can then include both computer devices and computing appliance devices. A "computer" may generally be characterized as a device that can be programmed to perform a number of different, unrelated functions. Examples of computers can thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" can refer to any network device that is capable of implementing a network management tool according to one or more aspects of the invention, such as a personal programmable computer. The term "computer appliance" then can refer to a network device that typically cannot implement a network management tool according to at least one aspect of the invention without additional augmentation. The term "computing device" is then used herein to include both computers and computing appliances.

With conventional networks located in a home, small office or other local environment, a network management tool according to various aspects of the invention can be implemented on a programmable personal computer, such as a desktop or laptop computer. A general description of this type of computer will therefore now be described.

An illustrative example of such a computer 201 as may be present in the network 101 described above is illustrated in FIG. 5. As seen in this figure, the computer 201 has a computing unit 203. The computing unit 203 typically includes a processing unit 205 and a system memory 207. The processing unit 205 may be any type of processing device for executing software instructions, but can conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

Figure 5:
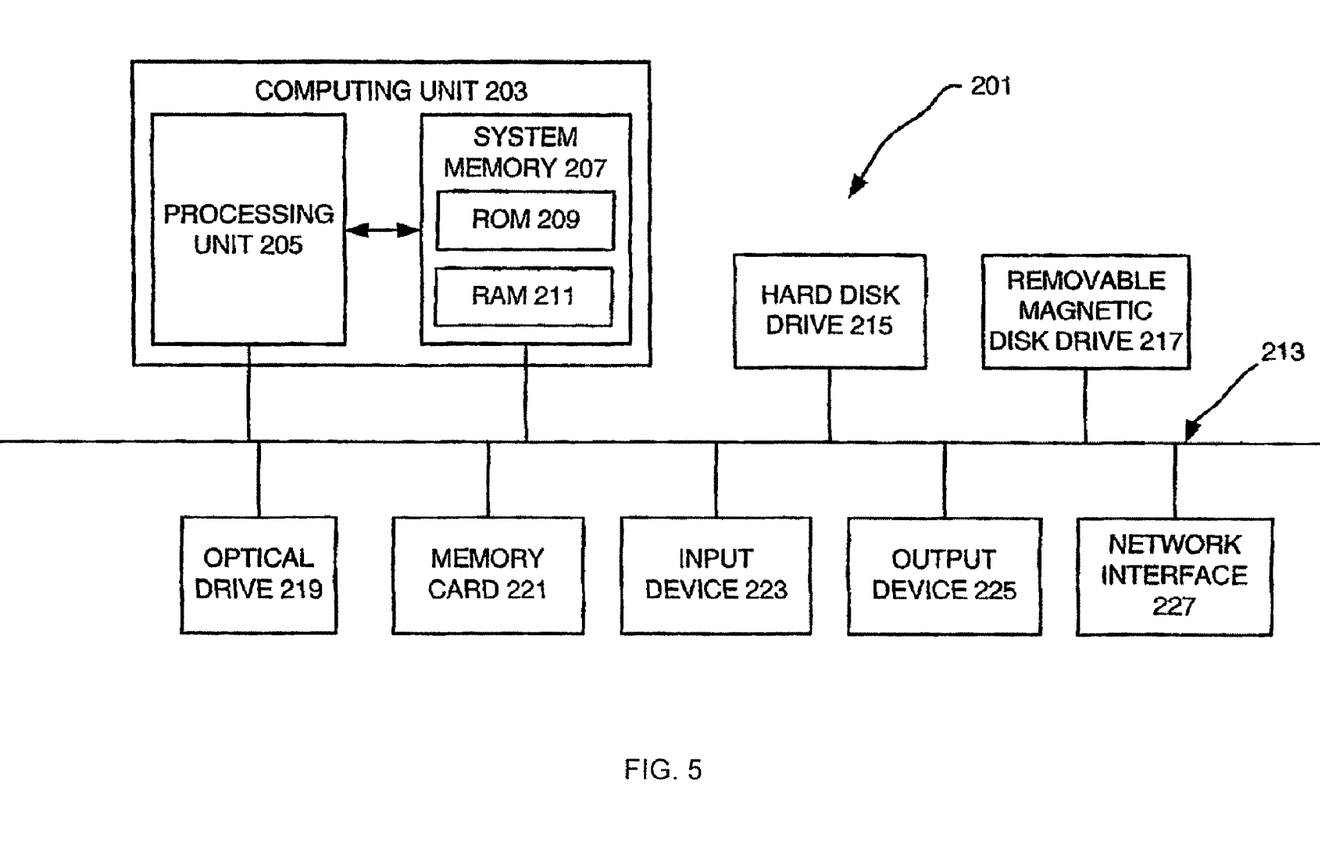
FIG. 5 is a functional block diagram of an operating environment in which an embodiment of the present invention may be implemented.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 can be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 5, may include only a subset of the components illustrated in FIG. 5, or may include an alternate combination of components, including some components that are not shown in FIG. 5.

It should be noted that, while a general description of a programmable personal computer was provided above, various aspects of the invention may be implemented on any desired device capable of supporting embodiments of the invention. For example, with some aspects of the invention, a network management tool may be implemented on special purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance can be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a client operating on a separate computing device.

As earlier alluded to, the conventional wisdom when configuring a wireless network is to select channels 1, 6 or 11. As these channels are in the center and at both extremes of the frequency spectrum, their energies overlap less than any other combination of channels. This guideline assumes, however, an ideal situation where all neighboring access points adhere to the same convention. In real-world situations this is rarely the case. More often than not, there may be neighboring access points on any random collection of channels other than 1, 6, or 11. It should also be noted that concurrent activity on overlapping channels causes significant degradation in performance over any one of such channels.

An embodiment of the invention employs an algorithm to determine the potential for overlapping transmissions that may interfere with a given network. As is discussed in further detail herein, an embodiment causes an access point or other capable polling device of a network to scan for all broadcasting access points in the vicinity of the network. It evaluates each access point by its signal strength and channel spread impact and calculates a density array that characterizes the entire channel-frequency spectrum. A final pass of the density array is performed to determine the channel with the lowest potential for interfering overlap.

Figure 6:
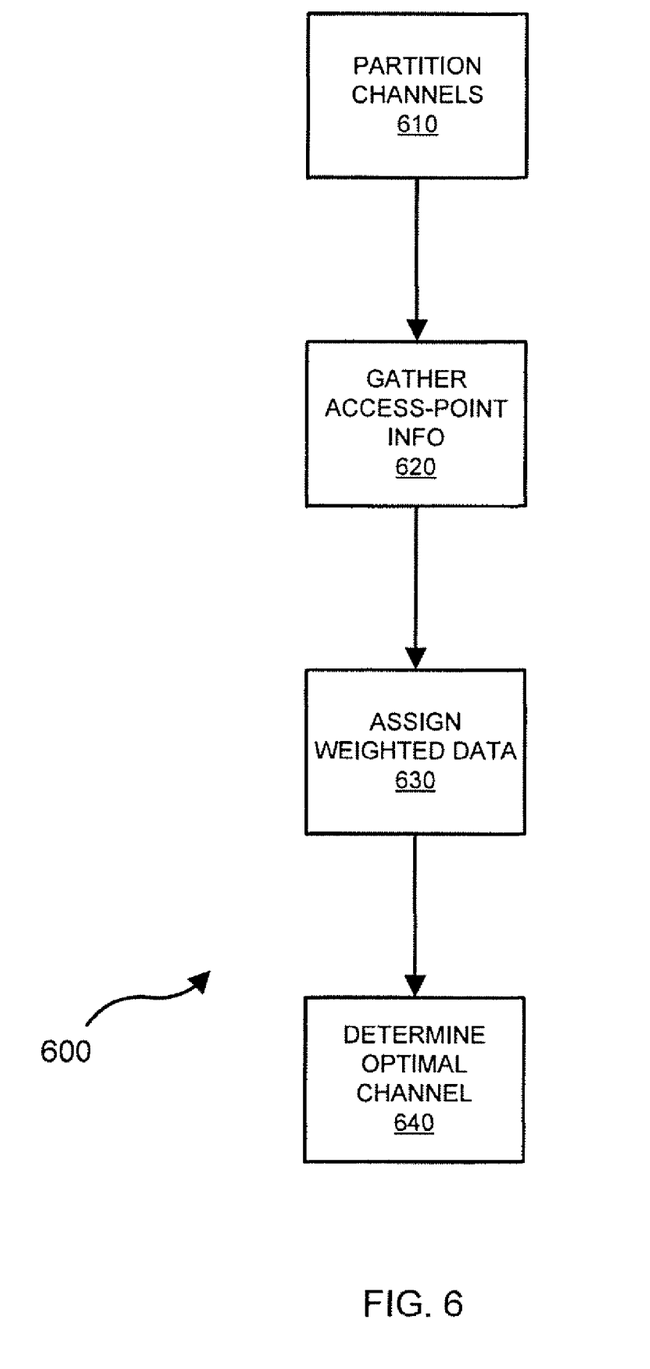
FIG. 6 is a flowchart illustrating a process according to an embodiment of the invention.

More specifically, and referring now to FIG. 6, a process 600 according to an embodiment of the invention is illustrated. The process 600 is illustrated as a set of operations shown as discrete blocks. The process 600 may be implemented in any suitable hardware, software, firmware, or combination thereof. As such the process 600 may be implemented in computer-executable instructions that can be transferred from one computer (not shown) to a second computer, such as a device on network 101, via a communications medium, such as Internet 107. Additionally, the process 600 can be implemented, for example, in any device 103, 105 of the network 101. The order in which the operations are described is not to be necessarily construed as a limitation.

At a block 610, the creation of a density array 710 (FIG. 7) commences with the dividing of each channel (represented schematically in FIGS. 7-9 as a set of staggered blocks 720) into multiple partitions (represented schematically in FIGS. 7-9 as a set of staggered blocks 730), each of which represents a predetermined frequency range such as, for example, 5 MHz.

At a block 620, information is gathered on all detectable access points. For example, one or more devices 103, 105 of the network 101 can detect, in a conventional manner, all access points broadcasting in the general vicinity of the network 101. Of specific interest in this detection/gathering function is the channel over which each access point is transmitting and the signal strength of such transmissions as measured at the detecting device 103, 105.

For purposes of the following illustrative example, and referring to Table 1 below, consider a case in which there are only 3 access points detectable by the detecting device 103, 105 and that would thus presumptively impact the wireless operation of network 101. For simplification of the example, and as a proxy for the actual Received Signal Strength Indication (RSSI) dBM value, we can assign values of 1-5 to the signal strength where 1==poor and 5==excellent:

TABLE 1

| Access Point Name | Signal Strength | Channel |
|---|---|---|
| Fish | 4 | 7 |
| Dog | 2 | 1 |
| Cat | 5 | 6 |

At a block 630, for each access point found, the associated impact is recorded by calculating and assigning to the density array 710 weighted impact-value data. In an embodiment, the impact-value data is calculated using the following equation:

$$\text{Value} = \text{RSSI} * \text{DM}$$

where "RSSI" is the signal strength of the access point and "DM" is a distance modifier applied to weight partitions according to their distance from the center of a corresponding channel. In the illustrated example, the inner 5 MHz partitions representing the frequency ranges closest to the frequency center of the channel are assigned a DM of 1.0 (i.e., 100%), while the outer partitions representing the frequency ranges farthest from the frequency center of the channel are assigned a DM of 0.75 (i.e., 75%).

Figure 7:
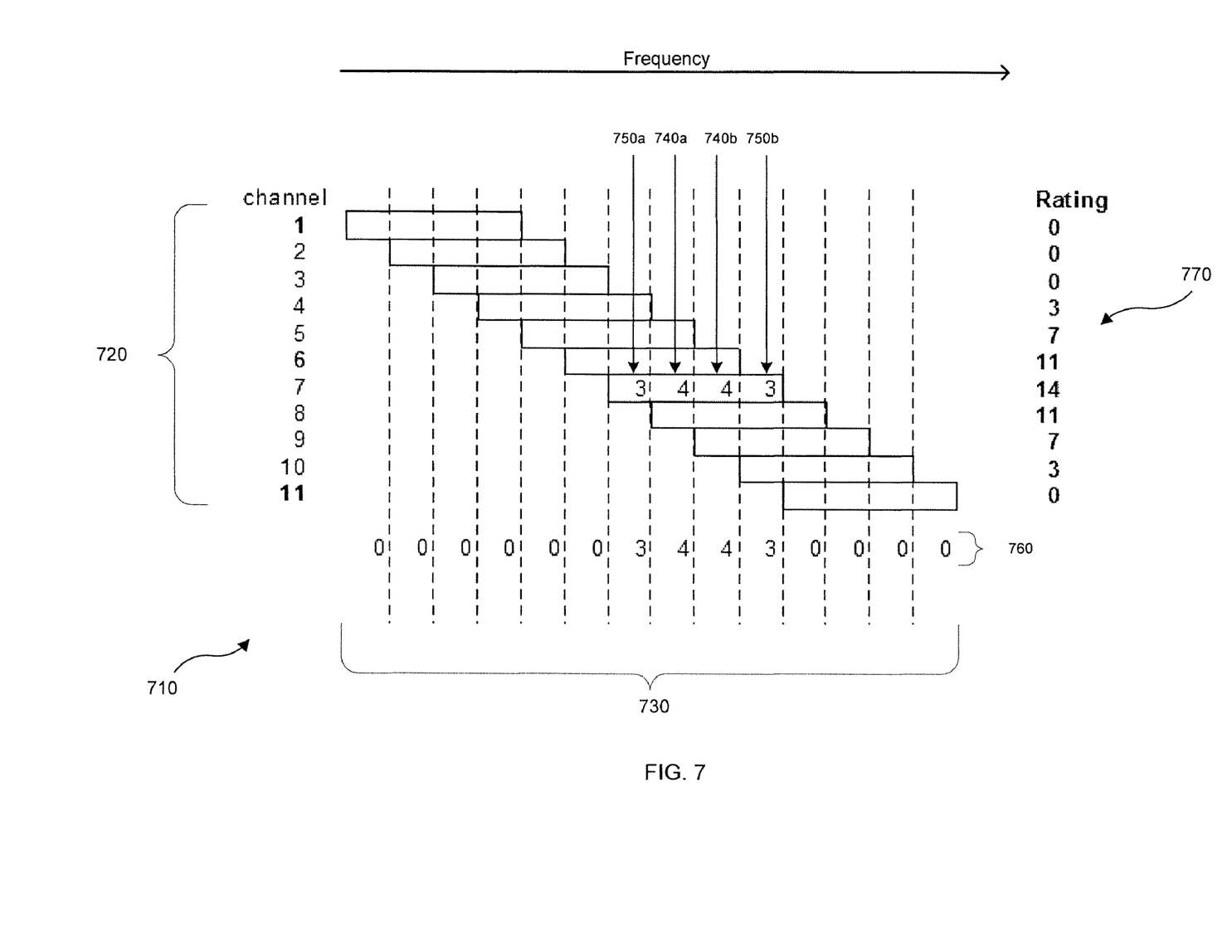
FIGS. 7-9 are schematic illustrations of a density array according to an embodiment of the invention.

As such, and referring to FIG. 7, an embodiment can first add the impact-value data of the Fish network to the density array 710. Accordingly, values of 4 (i.e., the signal strength of 4 multiplied by the DM of 1) are assigned to the inner partitions 740*a*, 740*b*, and values of 3 (i.e., the signal strength of 4 multiplied by the DM of 0.75) are assigned to the outer partitions 750*a*, 750*b* associated with channel 7.

Figure 8:
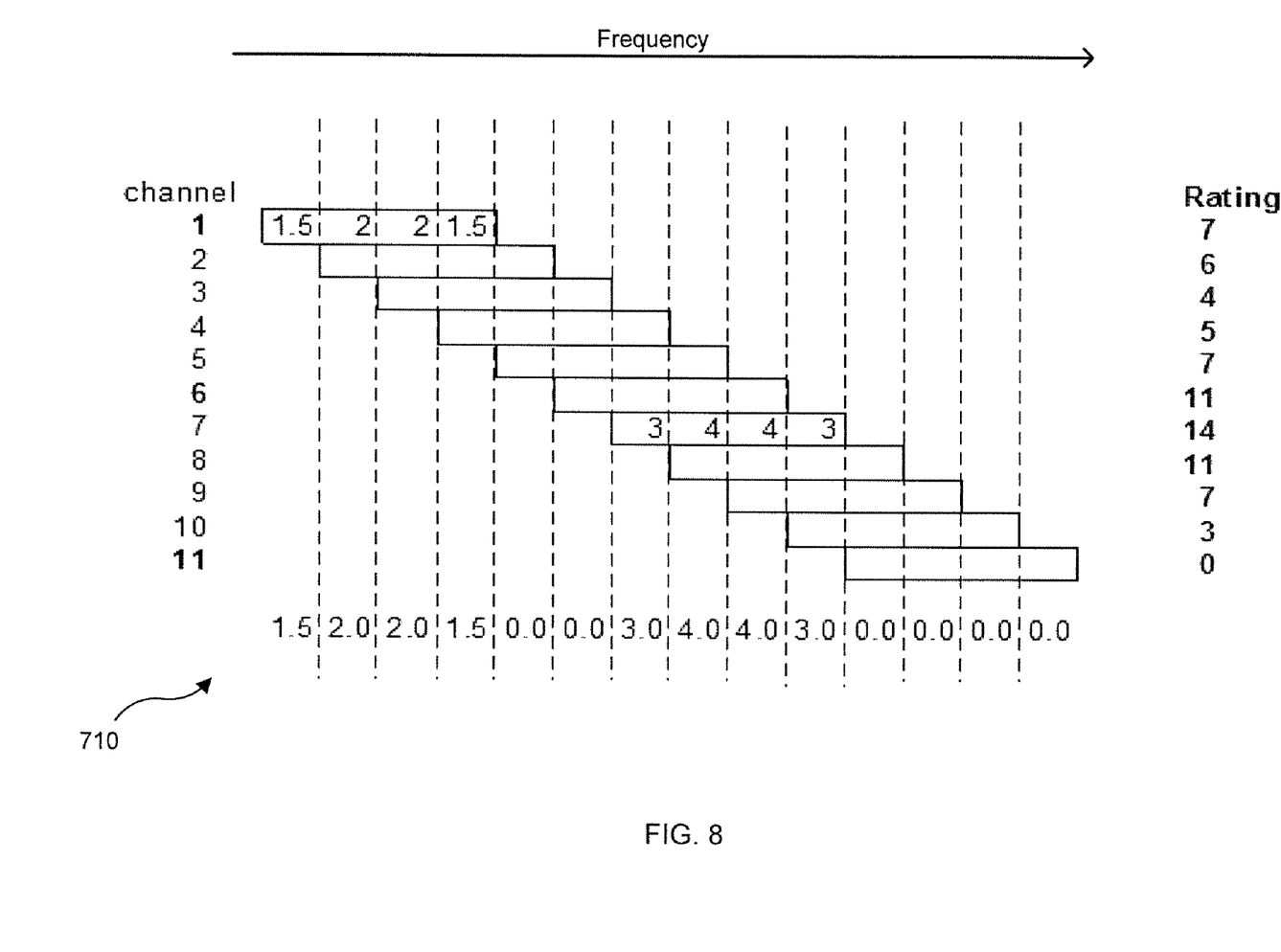
Figure 9:
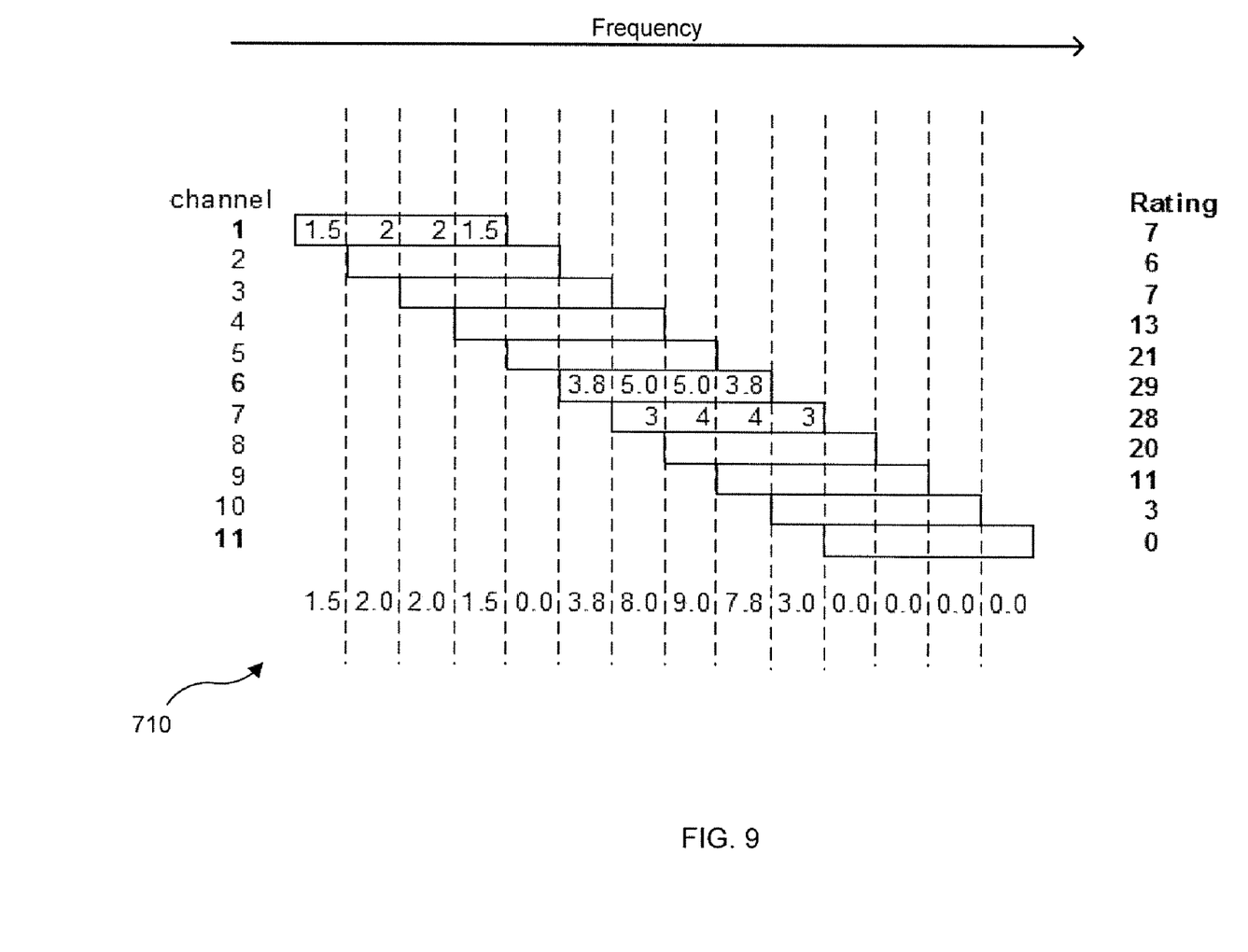

In a similar manner, and referring to FIGS. 8 and 9 respectively, the impact-value data of the Dog network and the Cat network are added to the density array 710.

Once the density array is filled in, at a block 640, the optimal channel on which the network 101 should operate is determined. In turn, to determine the optimal channel, a set of sums 760 of the weighted impact values associated with partitions of each respective frequency range is determined, as sequentially illustrated in FIGS. 7-9. Subsequently, a set of numerical ratings 770 is calculated for each respective channel. The numerical rating 770 of a particular channel is the respective sum of the sums 760 of the weighted impact values associated with partitions of the particular channel. The channel with the lowest rating (in the example illustrated in FIGS. 7-9, channel 11) is the channel least likely to encounter interference. In an embodiment, if two or more channels are tied for lowest rating, the channel with the lower-rated one or pair of neighboring contiguous channels may be selected.

An embodiment of the invention described above contemplates measuring the optimal channel for operating a single wireless device. For a given home network, a user might roam from room to room with their laptop, so a single test involving one device and the access point might not yield the optimal results for all devices on the network.

As such, an embodiment contemplates concurrently performing density analyses based on information gathered by all devices in the network having detection capability. Each density array can be reported back to a master PC or other network device, which can combine (via superimposition, for example) or otherwise analyze the arrays to determine the best available channel for the network as a whole.

While embodiments of the invention have been described with respect to specific examples including presently preferred modes of carrying out the invention, those skilled in the art will appreciate that there are numerous variations and permutations of the above described systems and techniques that fall within the spirit and scope of the invention as described herein. For example, while examples in this document generally refer to channels in the 2.4 GHz spectrum, it should be understood that one or more embodiments of the invention are applicable to 5 GHz or any spectrum that is sub-dividable into channels. Additionally, an embodiment of the invention described elsewhere herein calculates "potential" channel conflict/overlap, not actual conflict, based at least in part on the signal strength of access points. Signal strength alone is not always an indicator of interference as there may be no traffic across the access point at the time such access point is analyzed. As such, an embodiment includes performing period speed tests on a newly selected channel, adjusting channels, and taking new measurements to determine best throughput.

What is claimed is:

1. A non-transitory computer-readable medium having computer-executable instructions for performing operations comprising:
   collecting, with a first discovery component of a wireless network, a first set of information describing at least one transmission characteristic of each access point of a first set of at least one access points within a detection area of the first discovery component, each access point of the first set transmitting data over a respective channel of a set of channels; and
   determining an optimal channel of the set of channels, the optimal channel having associated therewith the lowest probability of interference with the channels over which the access points of the first set are transmitting, wherein determining the optimal channel comprises determining a numerical rating for each channel of the set of channels, and wherein determining the numerical rating comprises determining a broadcast impact analysis quantifying the aggregate energy signature of the set of access points.

2. The medium of claim 1 wherein the at least one transmission characteristic comprises a strength of a signal transmitted by the access points of the set as measured at the first discovery component.

3. The medium of claim 1 wherein determining the array comprises determining a numerical value of signal strength of each access point of the set.

4. The medium of claim 3 wherein determining the array comprises dividing each channel of the channel set into at least three partitions, each partition representing a predetermined frequency range, at least two of the partitions being outer partitions and at least one of the partitions being an inner partition, the at least one inner partition being closer than the outer partitions to a frequency center of a corresponding channel.

5. The medium of claim 4 wherein determining the array further comprises:
   multiplying each signal-strength value by a first weighting factor to obtain a first weighted impact value;
   multiplying each signal-strength value by a second weighting factor to obtain a second weighted impact value; and
   for each channel of the channel set over which an access point of the set is transmitting, associating each first weighted impact value with a corresponding inner partition, and associating each second weighted impact value with a corresponding outer partition.

6. The medium of claim 5 wherein the first weighting factor is equal to 1 and second weighting factor has a value less than 1.

7. The medium of claim 5 wherein determining the array further comprises determining a set of sums of the weighted impact values associated with partitions of each respective frequency range.

8. The medium of claim 7 wherein:
   the numerical rating of each channel comprises a respective sum of the sums of the weighted impact values associated with partitions of each channel; and
   the optimal channel comprises the channel having the lowest numerical rating.

9. The medium of claim 8 wherein determining the optimal channel comprises:
   determining that a plurality of the channels have the same lowest rating; and
   determining that the channel of the plurality having the lowest-rated at least one contiguous channel is the optimal channel.

10. The medium of claim 1, wherein the method further comprises:
    collecting, with a second discovery component of the wireless network, a second set of information describing at least one transmission characteristic of each access point of a second set of at least one access points within a detection area of the second discovery component, each access point of the second set transmitting data over a respective channel of the set of channels; and
    wherein the optimal channel is determined based on a combination of the first-set and second-set information, the optimal channel having associated therewith the lowest probability of interference with the channels over which the access points of the first and second sets are transmitting.

11. A method comprising:
    collecting, with a first discovery component of a wireless network, a first set of information describing at least one transmission characteristic of each access point of a first set of at least one access points within a detection area of the first discovery component, each access point of the first set having a respective energy signature; and
    determining an optimal channel of a set of available channels, the optimal channel having associated therewith an energy signature least likely to overlap with the energy signature of any of the first-set access points, wherein determining the optimal channel comprises determining a numerical rating for each channel of the set of channels, and wherein determining the numerical rating comprises determining a broadcast impact analysis quantifying the aggregate energy signature of the set of access points.

12. A method of transferring a computer program product from one first computer to one second computer connected to the first computer through a non-transitory communication medium, the method comprising:
    accessing computer-executable instructions for performing a method of optimizing the performance of a wireless network, the optimizing method including collecting, with a first discovery component of the wireless network, a first set of information describing at least one transmission characteristic of each access point of a first set of at least one access points within a detection area of the first discovery component, each access point of the first set transmitting data over a respective channel of a set of channels, and the optimizing method also including determining an optimal channel of the set of channels, the optimal channel having associated therewith the lowest probability of interference with the channels over which the access points of the first set are transmitting; and transferring the computer-executable instructions from the first computer to the second computer through the communication medium, wherein determining the optimal channel comprises determining a numerical rating for each channel of the set of channels, and wherein determining the numerical rating comprises determining a broadcast impact analysis quantifying the aggregate energy signature of the set of access points.

13. The method of claim 12 wherein the at least one transmission characteristic comprises a strength of a signal transmitted by the access points of the set as measured at the first discovery component.

14. The method of claim 12 wherein determining the optimal channel comprises determining a numerical value of signal strength of each access point of the set.

15. The method of claim 14 wherein determining the optimal channel further comprises dividing each channel of the channel set into at least three partitions, each partition representing a predetermined frequency range, at least two of the partitions being outer partitions and at least one of the partitions being an inner partition, the at least one inner partition being closer than the outer partitions to a frequency center of a corresponding channel.

16. The method of claim 15 wherein determining the optimal channel further comprises:
multiplying each signal-strength value by a first weighting factor to obtain a first weighted impact value;
multiplying each signal-strength value by a second weighting factor to obtain a second weighted impact value; and
for each channel of the channel set over which an access point of the set is transmitting, associating each first weighted impact value with a corresponding inner partition, and associating each second weighted impact value with a corresponding outer partition.

17. The method of claim 16 wherein the first weighting factor is equal to 1 and second weighting factor has a value less than 1.

18. The method of claim 17 wherein determining the optimal channel further comprises determining a set of sums of the weighted impact values associated with partitions of each respective frequency range.

19. The method of claim 18 wherein:
the numerical rating of each channel comprises a respective sum of the sums of the weighted impact values associated with partitions of each channel; and
the optimal channel comprises the channel having the lowest numerical rating.

20. The method of claim 19 wherein determining the optimal channel further comprises:
determining that a plurality of the channels have the same lowest rating; and
determining that the channel of the plurality having the lowest-rated at least one contiguous channel is the optimal channel.

21. The method of claim 12, wherein the optimizing method further comprises:
collecting, with a second discovery component of the wireless network, a second set of information describing at least one transmission characteristic of each access point of a second set of at least one access points within a detection area of the second discovery component, each access point of the second set transmitting data over a respective channel of the set of channels; and
wherein the optimal channel is determined based on a combination of the first-set and second-set information, the optimal channel having associated therewith the lowest probability of interference with the channels over which the access points of the first and second sets are transmitting.

* * * * *